United States Patent [19]

Adams

[11] Patent Number: 5,558,304
[45] Date of Patent: Sep. 24, 1996

[54] DEICER ASSEMBLY UTILIZING SHAPED MEMORY METALS

[75] Inventor: Lowell J. Adams, Dayton, Ohio

[73] Assignee: The B. F. Goodrich Company, Akron, Ohio

[21] Appl. No.: 213,395

[22] Filed: Mar. 14, 1994

[51] Int. Cl.⁶ .................................................. B64D 15/00
[52] U.S. Cl. ................................. 244/134 A; 244/134 E
[58] Field of Search ........................... 244/134 R, 134 A, 244/134 D, 134 E, 199, 203, 201

[56] References Cited

U.S. PATENT DOCUMENTS

| | | | |
|---|---|---|---|
| 3,885,758 | 5/1975 | Croswell, Jr. ........................ | 244/134 D |
| 4,732,351 | 3/1988 | Bird ..................................... | 244/134 D |
| 4,982,121 | 1/1991 | Lardiere, Jr. et al. ............... | 244/134 R |
| 5,098,037 | 3/1992 | Leffel et al. ......................... | 244/134 A |
| 5,150,864 | 9/1992 | Roglin et al. ........................ | 244/219 |
| 5,186,420 | 2/1993 | Beauchamp et al. ................ | 244/219 |
| 5,312,152 | 5/1994 | Woebkenberg, Jr. et al. .. | |
| 5,337,978 | 8/1994 | Fahrner et al. ...................... | 244/134 A |
| 5,356,096 | 10/1994 | Rauckhurst, III et al. ......... | 244/134 A |

*Primary Examiner*—Andres Kashnikow
*Attorney, Agent, or Firm*—Richard A. Romanchik

[57] ABSTRACT

An apparatus for deicing an outer shell includes an element comprised of shaped memory metal which undergoes a transformation from a weaker low temperature form (Martensite) to a stronger, high temperature form (Austenite) when the element is heated through its transformation temperature. The change in shape is utilized to deflect the outer shell to thereby shed ice accumulated thereon.

38 Claims, 12 Drawing Sheets

DEICER ASSEMBLY UTILIZING SHAPED MEMORY METALS

TECHNICAL FIELD

This invention relates to airfoil deicers, and more particularly to a mechanical deicer utilizing shaped memory metals.

BACKGROUND OF THE INVENTION

Under certain operating conditions aircraft are vulnerable to accumulation of ice on component surfaces. If left unchecked, such accumulations can eventually so laden the aircraft with additional weight and so alter the airfoil configuration of the wings as to cause undesirable flying conditions. A wide variety of systems have been proposed for removing ice from aircraft during flight or for preventing its accumulation on the leading edge surfaces of such aircraft. These systems can be categorized in three ways: thermal, chemical and mechanical.

The mechanical category of deicing systems covers a wide range of devices, all of which distort the airfoil surface in some manner so as to shed ice from the airfoil surface. A subcategory of mechanical deicing systems are high impact mechanical deicing systems which utilize high surface accelerations (normal to the surface) and strain to break and debond accumulated ice. Representative of such high impact systems are the electro-expulsive deicer, the eddy current deicer, the pneumatic impulse ice protection deicer, and the electro-impact deicing system. An example of electro-expulsive deicing systems can be found in three disclosures discussed hereinafter.

In U.S. Pat. No. 3,809,341 to Levin et al., flat buses are arranged opposite one another with one side of each bus being adjacent an inner or obverse surface of an ice collecting wall. An electric current is passed through each bus and the resulting interacting magnetic fields force the buses apart and deform the ice collecting walls. The disadvantage of this system is that each bus operates on the outer skin of the airfoil and a predetermined skin deflection is required to provide a set level of ice removal. Operating power needs often result in bus areas substantially smaller than skin areas, thereby necessitating large force requirements in order to generate the needed amount of skin deflection. Such high skin deflections are believed likely to cause fatigue in the skin.

U.S. Pat. No. 4,690,353 to Haslim et al. discloses a system wherein one or more overlapped flexible ribbon conductors are embedded in an elastomeric material affixed to the outer surface of an airfoil structure. The conductors are fed large current pulses and the resulting interacting magnetic fields produce an electro-expulsive force which distends the elastomeric member and separates the elastomeric member from a solid body such as ice thereon. The conductors in a single conductive layer as disclosed by Haslim et al. have a serpentine or zig-zag configuration.

Commonly owned U.S. Pat. No. 4,875,644 to Adams et al. discloses an electro-expulsive deicing system wherein a plurality of expulsive elements are placed in different layers on the airfoil surface, with each element being comprised of electrically conductive members interconnected such that electric current flowing in the conductive members flows in the same direction in adjacent electrically conductive members in a first sheet-like array and also flows in adjacent electrically conductive members of a second sheet-like array in a direction opposite to the first.

Commonly owned U.S. Pat. No. 4,706,911 and 4,836,474 disclose a high pressure pneumatic impulse deicer comprised of an outer skin having a substantially elevated modulus, and an pneumatic deflection means to deflect the skin in a short time span.

Metal weathering surfaces are commonly used as a durable, aerodynamic material in high impact mechanical deicing systems as described above. By common aircraft practice, the metal surface is formed to cover the airfoil shaped leading edge section to extend aft and be supported or attached to a spar or stringer for a wing or tail upper and lower surface or a former/bulk head center line to aft for an inlet. The extent or length of a given representative deicing element is substantially less than the metal surface that covers it. The deicer element impulse that causes the ice removing metal surface acceleration is restrained by the metal surface curvature and metal strain since it is fixed in place at its attachment points. Additional restriction to the deicing action comes from any bonding mechanism attaching the metal outer surface to the airfoil either directly or indirectly through other deicer elements. The metal surface strain is affected by its modulus of elasticity and thickness.

Both elements of the deicing action are inhibited by increased stiffness of a metal surface formed over smaller leading edge radius airfoil sections. The ice de-bonding acceleration impact action can be limited by any or all of these factors in combination on a metal surface: surface curvature, size of element relative to metal surface size, attachment mechanism of metal surface to the airfoil, metal modulus of elasticity and thickness and size of the airfoil leading edge radius.

Efforts to improve such mechanical deicing systems have led to continuing developments to improve their versatility, practicality and efficiency.

DISCLOSURE OF THE INVENTION

According to one aspect of the present invention, there is provided a deicing apparatus comprising:

a top shell upon which ice accumulates; and, element means comprised of shaped memory metal for changing shape into a predetermined transformation shape for deflecting said top shell when the temperature of said element means is raised to a predetermined transformation temperature.

According to another aspect of the present invention, there is provided a method of deicing an outer shell comprising the steps of:

providing a shaped memory metal element means beneath said outer shell; and deflecting said outer shell by changing the shape of said element means into a predetermined transformation shape by raising the temperature of said element means to a predetermined transformation temperature.

The present invention provides a deicer for an airfoil which is easy to manufacture, is more reliable than traditional deicers, and requires less power than existing electro-repulsion and eddy current type deicers while offering increased deicing areas. The present invention also realizes a reduced weight due to a lower force element weight than current electro-expulsion and eddy current deicer constructions. In addition, the present invention may be built in construction similar to deicers now used for conventional or small tube pneumatic deicers, electro-expulsive or electro-inductive deicers, or high pressure pneumatic deicers.

These and other objects, features, and advantages of the present invention will become more apparent in light of the detailed description of exemplary embodiments thereof, as illustrated by the drawings.

BEST MODE FOR CARRYING OUT THE INVENTION

Figure 1A:
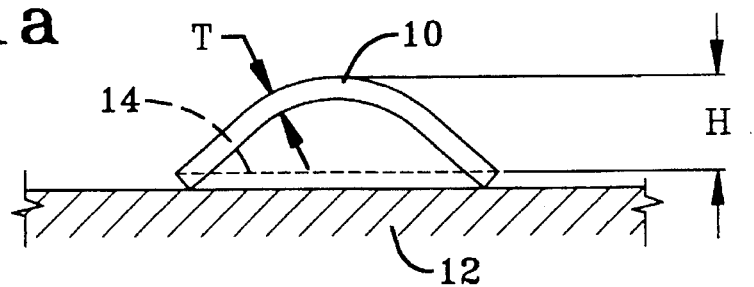
FIG. 1a is a cross sectional view of an energized deicer element in accordance with the present invention, disposed on a flat substrate.
Figure 1B:
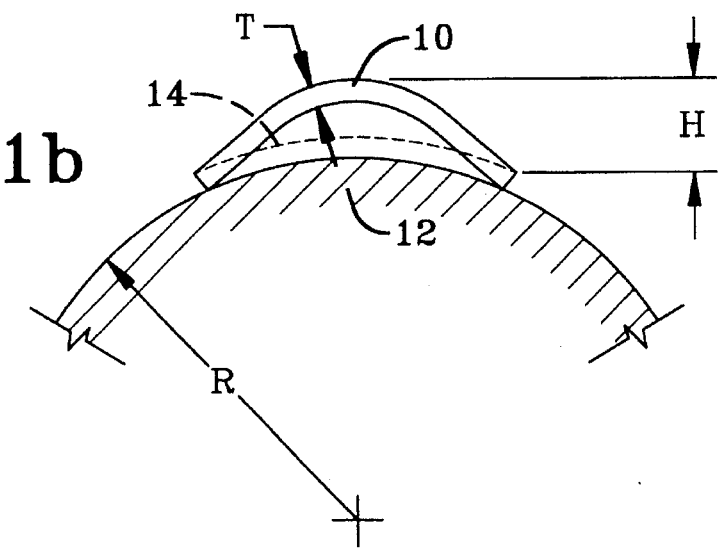
FIG. 1b is a cross sectional view of an energized deicer element in accordance with the present invention, disposed on a curved substrate.
Figure 2:
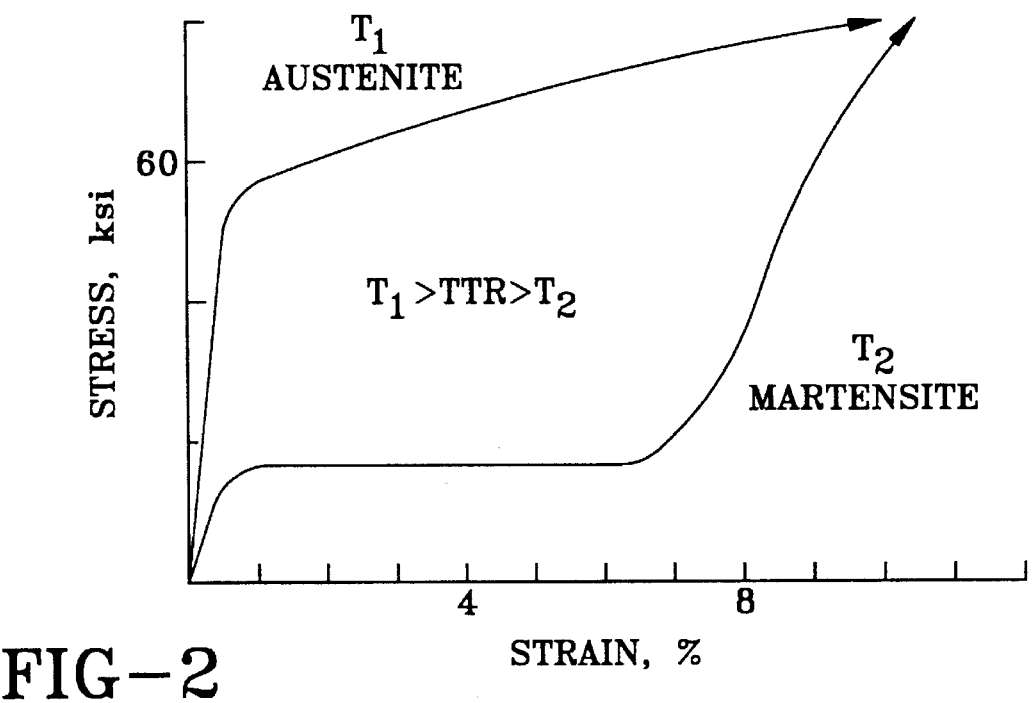
FIG. 2 is a graph showing a typical stress-strain curve for a NiTi alloy.

Referring now to the drawings wherein like reference numerals designate like or corresponding parts throughout different views, there is shown in FIGS. 1 and 2 a shaped memory metal deicer element or actuator 10 which is disposed on a substrate 12. When a high current electric pulse, with a fast rise and fall time and short duration is applied to element 10, the element is heated above its transformation temperature. The element 10 thereby takes its memory shape and applies a mechanical displacement impulse that sheds any ice accumulated thereon. Line 14 is indicative of the shape of element 10 before energization, and height H is indicative of the height reached upon energization of the element 10. Element 10 has a thickness T, typically 0.010–0.020 inches.

Referring now to FIG. 1b, wherein element 10 is illustrated disposed on a curved substrate 12, and wherein line 14 illustrates the original curved position of element 10. Substrate 12 has a curve having a radius R.

The actuator 10 consists of a flat metal strip which is generally straight in length or may be curved in an arc of as much as 10 to 15 degrees to fit compound curvatures. An arc exceeding 30 degrees may be difficult. The flat metal strip is built into deicer constructions to provide an impact force when rapidly heated and is made from a shaped memory metal alloy (SMA) which is cold formed to a flat or slightly curved shaped and hot formed to a pronounced curved memory shape that is parabolic, triangular, sinusoidal or other desired shapes. Such a shape is shown in FIG. 1a on a flat surface and in FIG. 1b on a curved surface. When heated directly by an electrical current or indirectly by an electrical heater, the SMA converts heat to work, going from the flat or slightly curved state to its pronounced curved memory shape when heated past the transformation temperature. When cooled, the SMA actuator is returned to its flat or slightly curved shape by the return forces of the deicer construction.

Technically, the SMA actuators undergo a transformation in their crystalline structure when cooled from the stronger, high temperature form (Austenite) to the weaker low temperature form (Martensite). The Martensite is easily deformed to a new shape. When the metal is heated through its transformation temperature, it reverts to Austenite and goes back to its previous memory shape with great force. This process can be repeated millions of times.

The transformation temperature (TTR) at which the SMA "remembers" its memory shape can be manufactured over a range from above +100° C. to below −100° C. The shape recovery occurs over just a few degrees. FIG. 2 shows a typical stress-strain curve for annealed Nickel-Titanium (NiTi) alloy when heated above the TTR and cooled to the Martensite phase below the TTR.

The stress that can be obtained from NiTi upon recovery will be about 25,000 psi for a high TTR (>50° C.) and will increase as the TTR decreases with at least 50,000 psi for a TTR of 0° C. The memory strain for NiTi alloy is 8 percent. Copper based SMA such as Copper-Zinc-Nickel and Copper-Zinc-Aluminum have about 4 percent memory. A stainless steel based SMA (FeCr-Ni-Co-Mn-Si or Fe-Cr-Ni-Mn-Si) has about 4 percent memory.

Permanent deformation, or strain, will tend to occur to a small degree in most cycle applications with significant stress (>20,000 psi). This strain will be less than 5% after a million cycles and most of it occurs within the first few hundred cycles.

The transformation from Martensite to Austenite can occur very rapidly, as fast as heat can be put into the material and from Austenite back to Martensite as fast as the heat can be taken back out. Theoretical maximum energy conversion is about 5 to 6 percent; practical efficiency is about 3 to 4 percent. Shape memory transformation times less than one millisecond have been observed, once the metal reaches the TTR.

It is to be noted that other SMAs than those mentioned could also be used. Cost, availability in the desired form and ease of use as well as the force that can be produced are all considerations for selection of a particular SMA for use in a deicer. Table I below lists a number of alloys which have a shaped memory effect.

TABLE I

| Alloy | Composition | Transformation Temperature Range, °C. | Transformation Hysteresis, °C. |
|---|---|---|---|
| AgCd | 44⁻49 at % Cd | −190⁻−50 | ~15 |
| AuCd | 46.5⁻50 at % Cd | 30⁻100 | ~15 |
| CuAlNi | 14⁻14.5 Wt % Al<br>3⁻4.5 Wt % Ni | −140⁻100 | ~35 |
| CuSn | ⁻15 at % Sn | −120⁻30 | |
| CuZn | 38.5⁻41.5 Wt % Zn | −180⁻−10 | ⁻10 |
| CuZn X<br>(X = Si, Sn, Al) | few Wt % X | −180⁻200 | ⁻10 |
| InTi | 18–23 at % Tl | 60⁻100 | ⁻4 |
| NiAl | 36⁻38 at % Al | −180⁻100 | ⁻10 |
| NiTi | 49⁻51 at % Ni | −50⁻110 | ⁻30 |
| FePt | ⁻25 at % Pt | ⁻−130 | ⁻4 |
| MnCu | 5⁻35 at % Cu | −250⁻180 | ⁻25 |
| FeMnSi | 32 Wt % Mn, 6 Wt % Si | −200⁻150 | ⁻100 |
| Fe—Cr—Ni—Co—Mn—Si | — | −100⁻300 | ⁻50 |
| Fe—Cr—Ni—Mn—Si | — | −100⁻300 | ⁻50 |

Figure 3A:
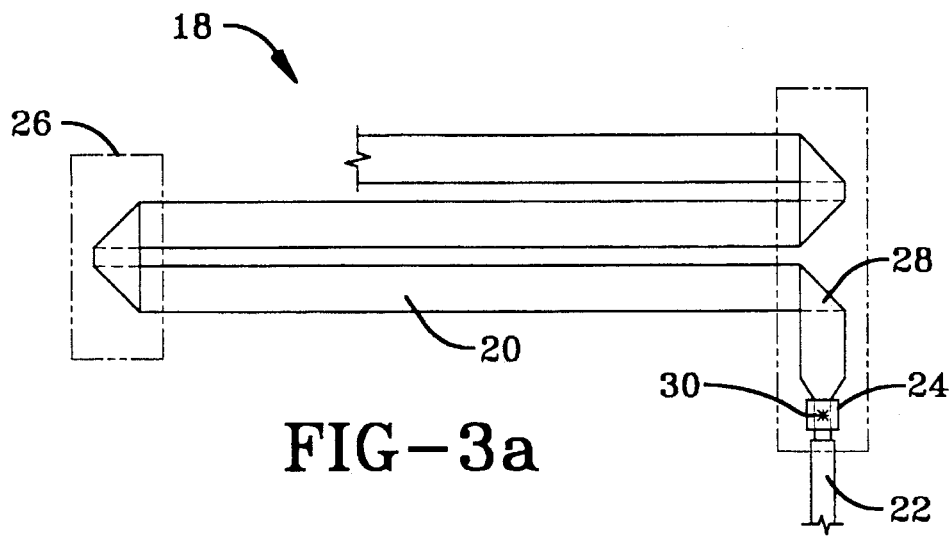
FIGS. 3a–3e are fragmentary top views of five different embodiments of deicer elements in accordance with the present invention.

Referring now to FIGS. 3a–3e, the SMA actuator 10 may be used either as a continuous strip or a number of short strips to construct a deicer element for incorporation into a number of different deicer construction. FIG. 3a shows a serpentine deicer element 18 formed from a continuous SMA actuator strip 20. Power is supplied through a lead 22 and connection means 24, such as by soldering. A double fold 26 keeps the proper side of the SMA strip in the desired orientation for use as a deicer element. A single fold 28 permits a right angle connection or the flat strip can be brought straight out for the electrical connection 24 (for direct heating). A tapered end 30 permits a crimp type connection 24 to a round or flat braid stranded wire. Alternatively, a wave crimp or a variation thereof may provide an alternate method of providing a low resistance gas tight electrical contact, depending on how ductile the SMA material is. In addition, ultrasonic welding may be used.

Figure 3B:
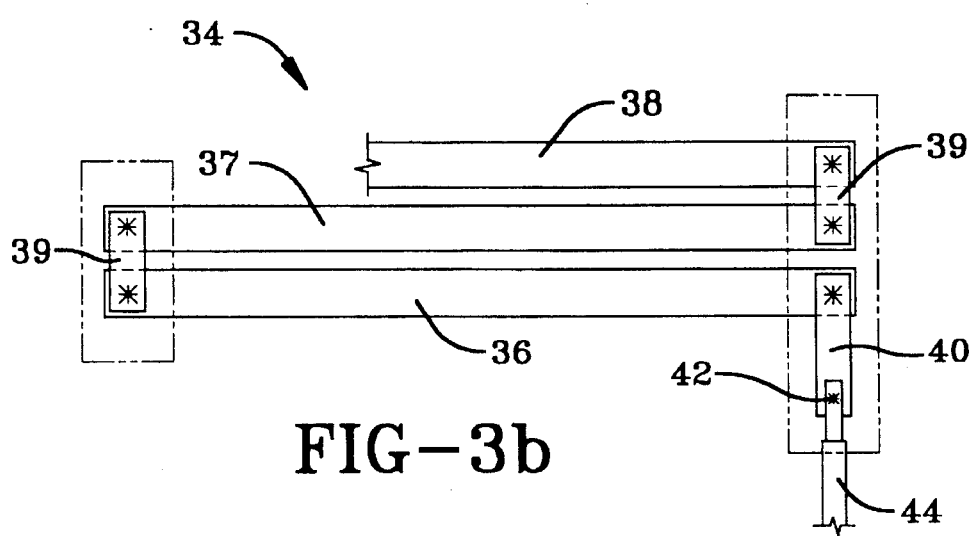

FIG. 3b shows a serpentine deicer element 34 comprised of piecewise strips 36–38. The piecewise construction permits easy insertion of the SMA actuator strips into a "tube" type construction after construction of a basic deicer "carcass". Welded metal strips 39 (such as nickel for NiTi) permits connection of the ends of strips 36–38 to make a continuous electrical circuit. A soldered or brazed connection is also possible, but may be difficult to accomplish. Use of a end nickel strip 40 permits a solder or welded connection 42 to a wire 44 (round or flat braid). A crimp type connection is also possible.

Figure 3C:
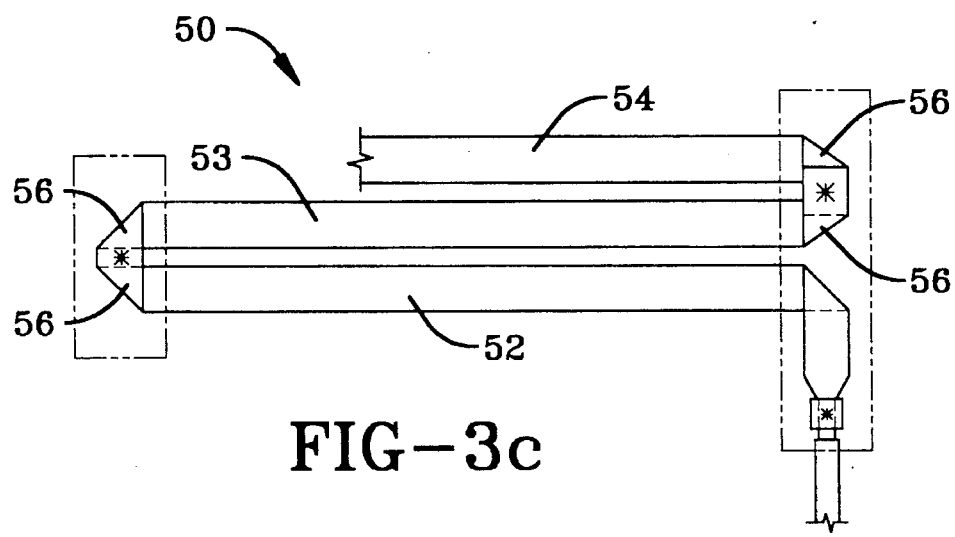

FIG. 3c shows a serpentine deicer element comprised of a piecewise single fold serpentine deicer construction where the SMA strips 52–54 are welded after a single fold 56 at both ends of each strip.

Figure 3D:
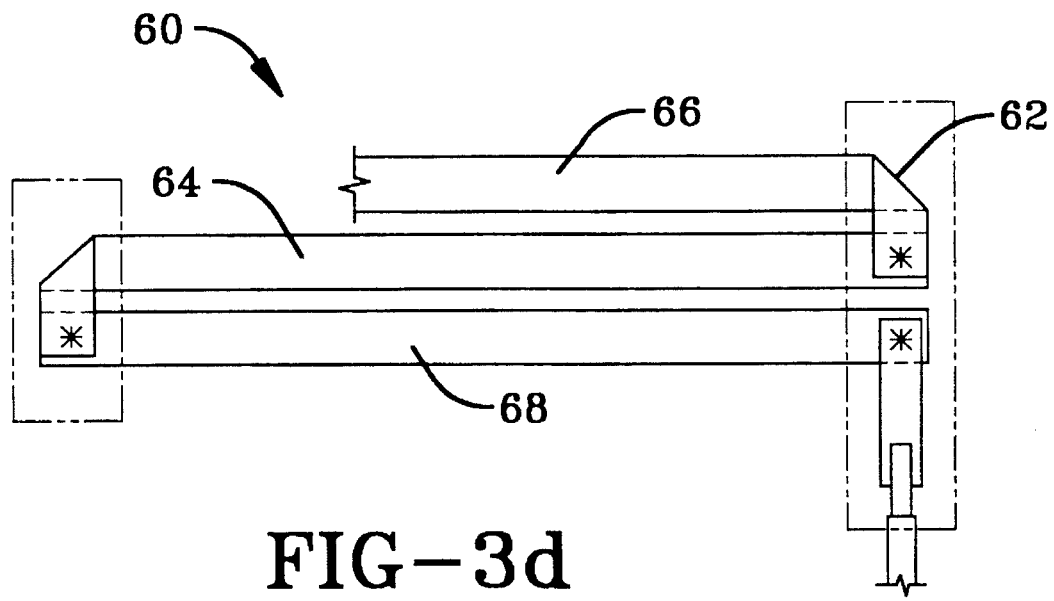

FIG. 3d shows a serpentine deicer element 60 having a similar construction as to element 50 in FIG. 3b, but with a single fold 62 at only one of the SMA strips 64, 66. The first strip 68 is straight.

Figure 3E:
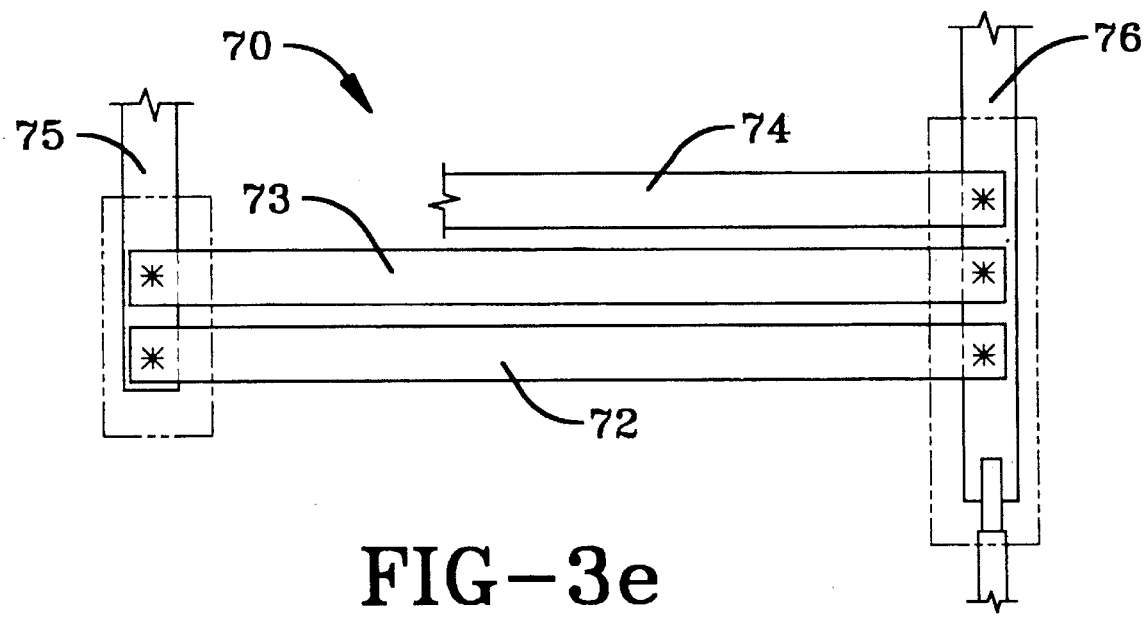

FIG. 3e shows a deicer element 70 having parallel piecewise strips 72–74 connected between a pair of bus type strips 75, 76. A similar construction could be utilized using the continuous strip double fold construction illustrated in FIG. 3a with the fold areas being welded or otherwise attached to the parallel buses 75, 76. A deicer construction might use a number of parallel element areas connected in series or parallel. Crimp style connections rather than a welds may also be utilized.

Figure 4A:
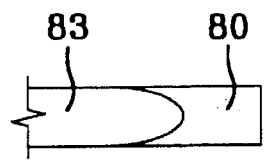
FIGS. 4a–4c are top, representational views of the heat treating of three different deicer element embodiments in accordance with the present invention.
Figure 4B:
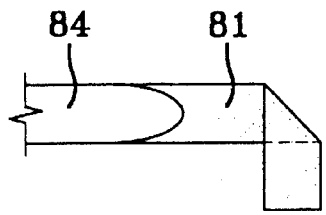
Figure 4C:
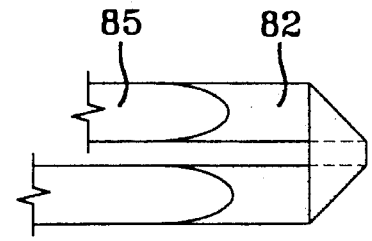

FIGS. 4a–4c shows the heat treated flat areas 80–82 that permit the SMA flat strips 83–85 which takes a curved shape above the SMA transformation temperature, to remain flat in the shapes shown in 3a through 3e in the folds and leadwire attachment areas during energization. These areas are annealed to the flat condition prior to use for piecewise strips or continuous strips or after being built into the construction by localized heat treatment.

Figure 5A:
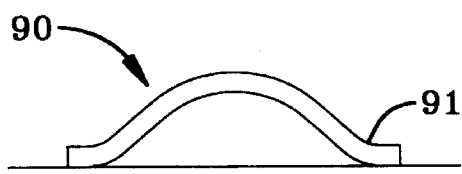
FIGS. 5a–5d are cross sectional views of four different embodiments of deicer elements in accordance with the present invention.
Figure 5B:
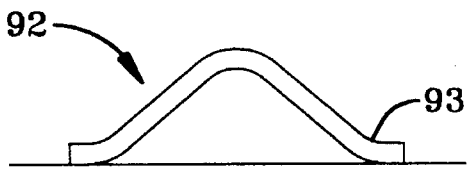
Figure 5C:
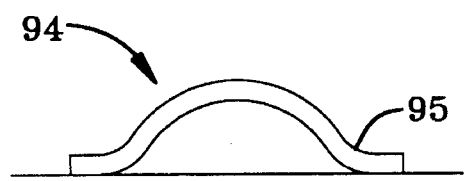
Figure 5D:
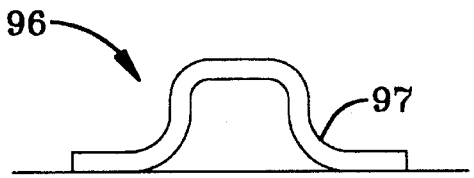

FIGS. 5a through 5d show some of the possible cross section shapes for the width of SMA force element strips described hereinbefore. FIG. 5a illustrates a sinusoidal or parabolic shape 90, FIG. 5b illustrates a triangular shape 92, FIG. 5c illustrates a semicircular shape 94 and FIG. 5d illustrates a square shape 96. A "tube" type construction might take the shape of an "inflated" tube or other shapes if proven more effective. More exotic shapes such as multiple folds (fanfold) using the basic shapes might prove desirable. Shaped edges 91, 93, 95, 97 are shown also, which would permit force element strip movement with reduced wear in the internal deicer construction.

Figure 6A:
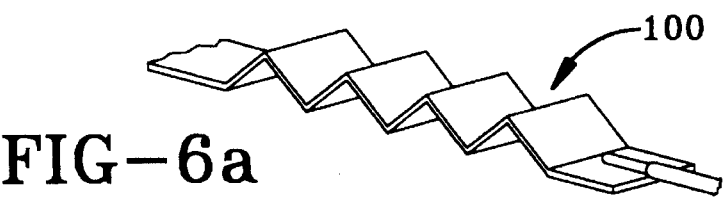
FIGS. 6a–6b are isometric views of two different embodiments of deicer elements in accordance with the present invention.

FIG. 6a shows a lengthwise shaped (triangular shown) SMA force element 100 that would be used similar to that of the widthwise shaped elements 90, 92, 94, 96 illustrated hereinbefore. Although more element movement would occur in the lengthwise direction, this approach might be desirable for some constructions. Any of a number of basic shapes could be used to maximize force or movement. This type shape could fold flat on itself below TTR to minimize lengthwise movement if reduced force is acceptable. Lengthwise movement with the element secured at some point, such as at an end or center, could aid in ice removal by combining a vertical movement with horizontal movement. The deicer construction would return the lengthwise shaped element to its flat position below TTR.

Figure 6B:
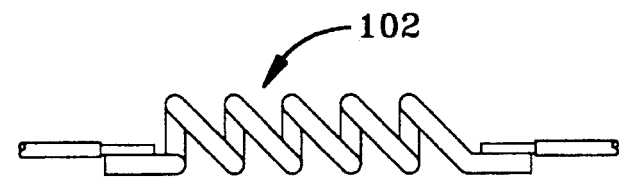

FIG. 6b shows a lengthwise shaped SMA force element 102 using a canted coil spring shape that would lie flat below the SMA transformation temperature and take a shape similar to that illustrated above the SMA transformation temperature. Of course, other coiled shapes could also be used.

Figure 7:
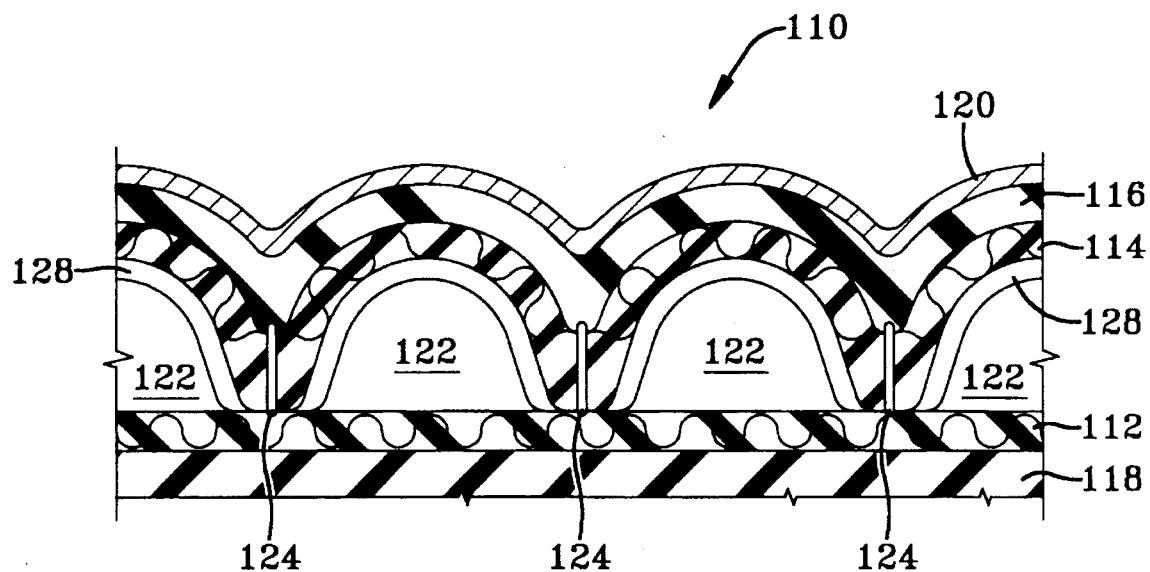
FIG. 7 is a fragmentary cross sectional views of a deicer assembly in accordance with the present invention.

Referring now to FIG. 7, wherein a deicer assembly 110 in accordance with one embodiment of the present invention includes an inner ply or layer 112 and an outer ply 114 which may be of a fabric coated with rubber of other resilient rubber like material. The outer ply 114 may be covered by an outer sheet member 116 and the inner ply 112 may be covered by an inner sheet member 118, both of which may be of resilient rubber like material such as neoprene. An erosion-resistant surface ply or layer 120 may cover outer sheet member 116 and may be comprised of erosion resistant material such as polyurethane, neoprene or estane. Surface ply 120 may also be a high-modulus metal foil such as aluminum, titanium, stainless steel, or a nickel-titanium superelastic alloy (with rubber-like deformation behavior), or a high modulus thin layer of thermoplastic film such as polyetheretherkeytone ("PEEK"). Deicer assembly 110 has a plurality of passages or tube like members 122 (typically ¼ in. to ⅜ in. wide and running the length of the deicer, i.e. in the spanwise direction of the airfoil) formed by adjacent rows 124 of stitching between the inner ply 112 and outer ply 114. A double stitch could be used wherever desired for added strength. Deicer assembly 110 may be constructed in a similar fashion as the deicers taught in commonly owned U.S. Pat. No. 5,112,011 to Weisend, Jr. et al., which is hereby incorporated herein by reference.

SMA elements or actuator strips 128 such as those described and illustrated hereinbefore in the previous figures are disposed in the passages 122. When heated or energized above their TTR, SMA elements 128 deform overlying layers 114, 116, 120 upward to deflect ice accumulated on layer 120. Elements 128 are shown in their energized or heated state. Vacuum may be applied, if necessary, to prevent auto-inflation of passages 122 and to return the elements 128 to their original shape after energization. If a metal foil or non-elastomer (such as PEEK) surface ply is used, the vacuum connection could be eliminated.

One possible construction technique for assembly 110 would be to build and cure the deicer without SMA elements 128. The SMA elements would then be added later with a spot cure or cold patch beyond the SMA elements or over the heat treat "flat" areas only. To clear the sewn tubes prior to insertion of the SMA elements, the tubes could be "inflated" using the air connection or mechanically cured using a teflon or metal strip inserted down the tube to release any sticking tubes.

Figure 8:
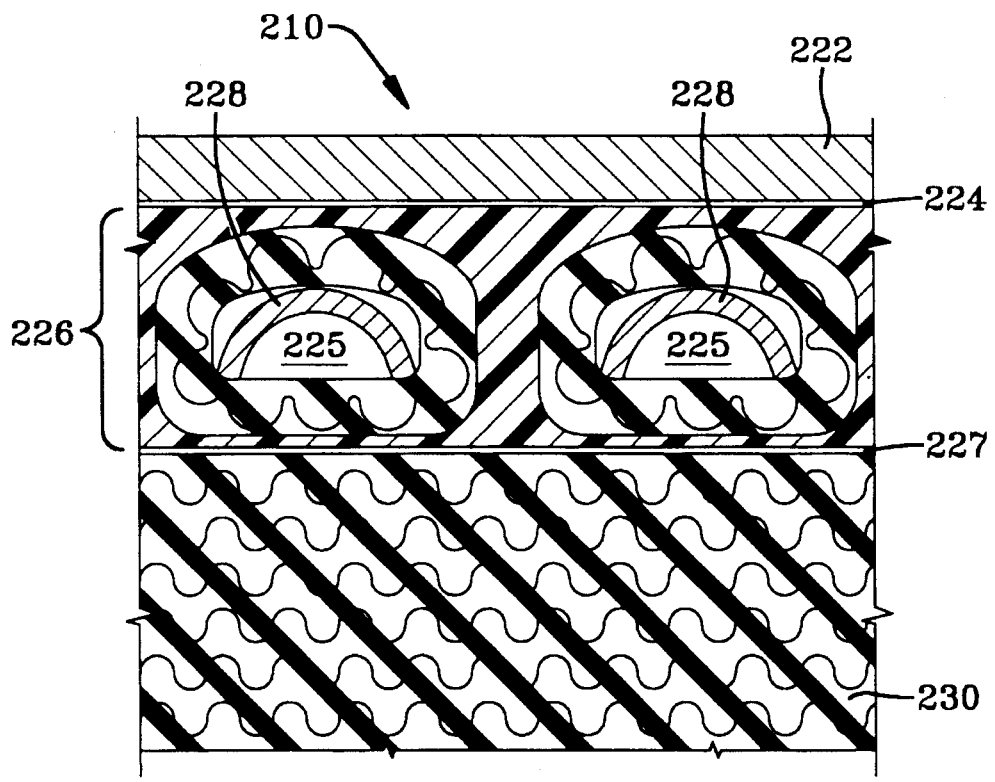
FIG. 8 is a fragmentary cross sectional view of a second embodiment of a deicer assembly in accordance with the present invention.

Referring now to FIG. 8, wherein a deicer assembly 210 in accordance with an alternative embodiment of the present invention includes a surface ply or outer skin 222 of a material having a modulus of elasticity of at least 40,000 Kpa. Immediately underlying the outer skin 222 is an outer skin bonding ply 224 of polymeric material. Immediately underlying the skin bonding ply 224 is a distortion means 226. Immediately underlying distortion means 226 is an inner bonding ply 227 of polymeric material. Underlying the inner bonding ply 227 is a fiber reinforced composite substructure 230.

The outer skin 222 may be formed from metal such as titanium, stainless steel or aluminum alloys or plastic such as PEEK. Bonding plies 224 and 227 are formed of polymeric material suitable for bonding to the layers on either side, such as nitrile phenolic resin or film adhesive AF32 available from 3M Company.

Distortion means 226 has a plurality of tube like structures or members 225 typically running the length of the deicer, i.e. in the spanwise direction of the airfoil. Each tube like member 225 is formed from polymer coated textile fabric. The fabric may be coated on one side only and formed into a tubular member with the coating facing to the outside of the tube or with the coating facing the inside of the tube provided an adhesion barrier is placed in the inside of the tube during manufacture to prevent adhesive joining the fabric layers, thereby preventing formation of an inflatable tubular member. Polytetrafluoroethylene (PTFE) film is well suited for use as an adhesive barrier in this application. Deicer assembly 210 may be constructed in a similar fashion as the deicers taught in commonly owned U.S. Pat. No. 5,098,037 to Leffel et al., which is hereby incorporated herein by reference. SMA elements or actuator strips 228 such as those described and illustrated hereinbefore in the previous figures are disposed in the passages 225. When heated or energized above their TTR, SMA elements 228 deform overlying layers 222, 224 upward to deflect ice accumulated on layer 222. A vacuum source would not be required to prevent auto-inflation or return the SMA elements 228. Elements 228 are shown in their energized or heated state.

The fiber-reinforced polymer composite substructure 230 is formed of a plurality of layers of filamentary material in a matrix of thermoset polymeric material. Such materials and their combination into a laminated composite substructure are well known in the art. For instance, substructure 230 may be comprised of graphite, carbon, aramid or fiberglass fibers reinforcing an epoxy matrix.

Figure 9A:
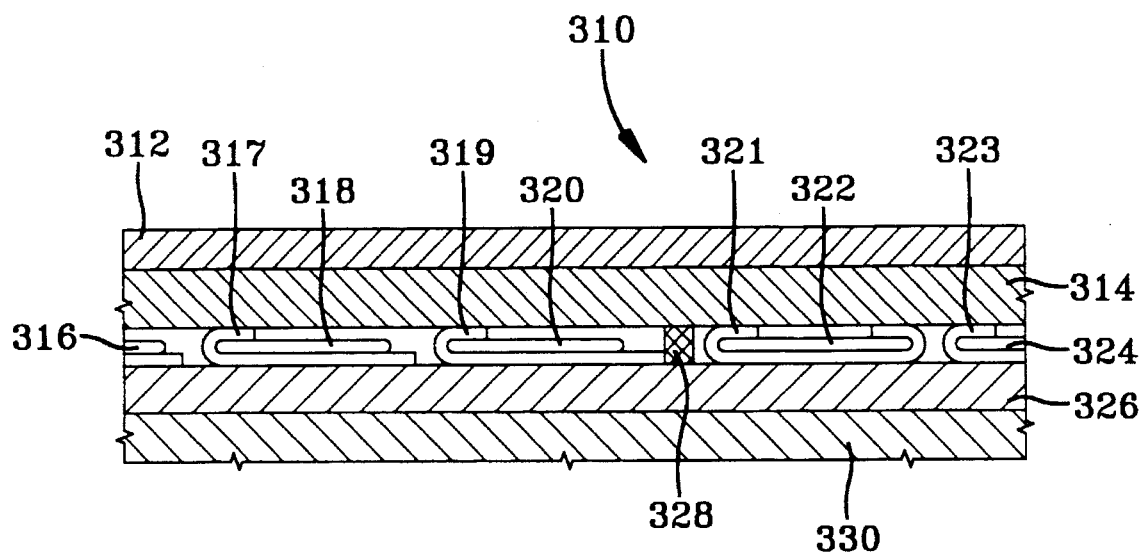
FIGS. 9a–9b are fragmentary cross sectional views of a third embodiment of a deicer assembly in accordance with the present invention.
Figure 9B:
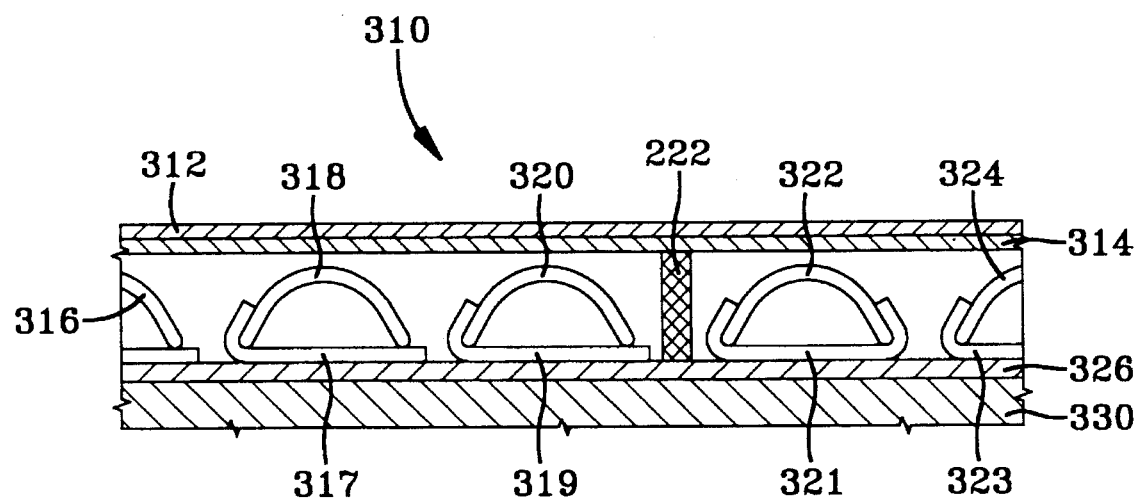

Referring now to FIGS. 9a, 9b, wherein a deicer assembly 310 in accordance with a third embodiment of the present invention includes a surface ply or outer skin 312 of an erosion-resistant material such as polyurethane, neoprene or estane or a high-modulus metal foil such as aluminum, titanium, stainless steel, or a nickel-titanium superelastic alloy (with rubber-like deformation behavior), or a high modulus thin layer of thermoplastic film such as PEEK. Underlying outer skin 312 is a backing layer 314 of epoxy or toughened thermoset resin. Underlying layer 314 are SMA elements 318, 320, 322, 324 such as those described and illustrated hereinbefore in the previous figures which are held captive by material pieces or partial tubes 317, 319, 321, 323, which are disposed on or attached to a rigid bottom layer 326 which may be comprised of a plastic composite such as epoxy reinforced with graphite, aramid or glass fibers. Bottom layer 326 may be connected to layer 314 with a number of appropriately positioned resilient attachment members 328 (only one of which is shown), which may be made of elastomeric material. The airfoil surface which is being protected is represented by layer 330. Material pieces 317, 319, 321, 323 are preferably comprised of a polymer coated textile fabric.

Alternatively, backing layer 314 may be formed from fiber reinforced plastic material, such as nitrile phenolic or epoxy impregnated into a fabric composed of fibers belonging to one of a group including carbon fibers, glass fibers, and nylon fibers. The surface layer 312 can be formed from rubber, metal, or plastic, such as neoprene, titanium foil, PEEK film, polyurethane film, and polyurethane paint depending on the application.

The SMA elements might be secured at only one edge, exemplified by elements 318, 320 or an "open tube" construction may be used, where the element is held captive by two edges, exemplified by elements 322, 324. The partial tubes 317, 319, 321, 323 facilitate keeping the SMA elements 318, 320, 322, 324 positioned correctly. The partial tubes may be bonded to the SMA elements using a suitable adhesive.

Resilient connection members 328 must have enough elasticity to stretch when SMA elements deflect layers 314 and 326 apart, and pull the layers together after the deflection cycle. The term "elastic" refers to the tendency of a material to return entirely to its rest state within a short period of time after an imposed force is removed. Examples of suitable materials for the connection members 328 include natural rubber, and synthetic rubbers such as butyl or silicone rubber.

Figure 10A:
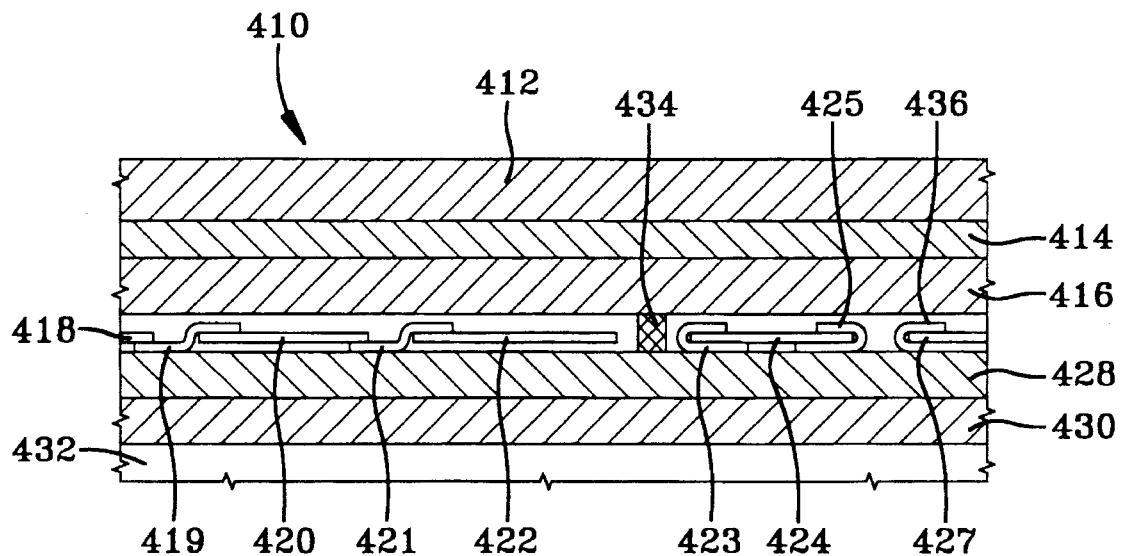
FIGS. 10a–10b are fragmentary cross sectional views of a fourth embodiment of a deicer assembly in accordance with the present invention.
Figure 10B:
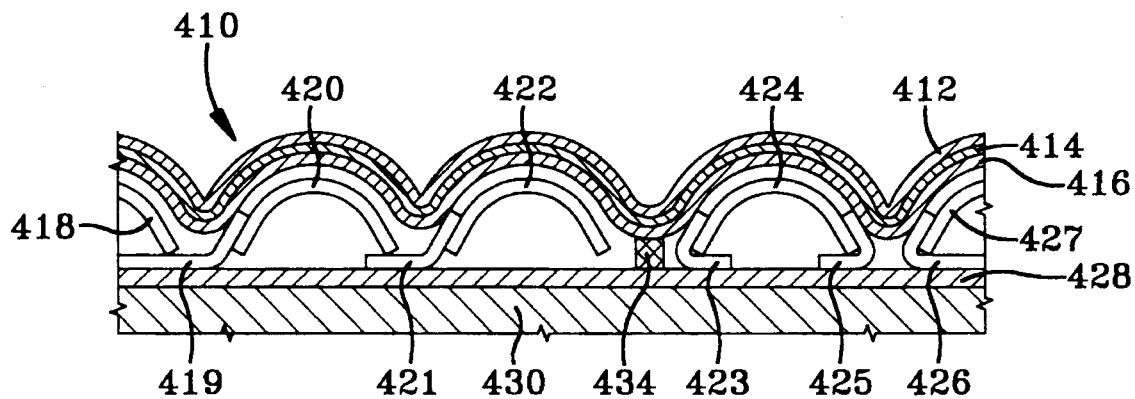

Referring now to FIGS. 10a, 10b, wherein a deicer assembly 410 in accordance with a fourth embodiment of the present invention includes a surface ply or outer skin 412 of an erosion-resistant material such as polyurethane, neoprene or estane. Underlying erosion layer 412 is an elastic layer 414 of elastomeric material, such as natural rubber. Underlying elastic layer 414 is a backing layer 416 of stretch fabric, such as treicot woven nylon. Underlying backing layer 416 are SMA elements 418, 420, 422, 424, 427 (similar to those described and illustrated hereinbefore in the previous figures) which are held captive by material pieces 419, 421, 423, 425, 426, (similar to those described and illustrated hereinbefore in the previous figures) which are disposed on a layer 428 of non-stretch fabric such as square woven nylon. A bottom layer 430 of rubber is provided between fabric layer 428 and the airfoil 432. Bottom layer 430 may be connected to layer 428 with a number of appropriately positioned resilient attachment members 434 (only one of which is shown), which may be made of elastomeric material.

Figure 11:
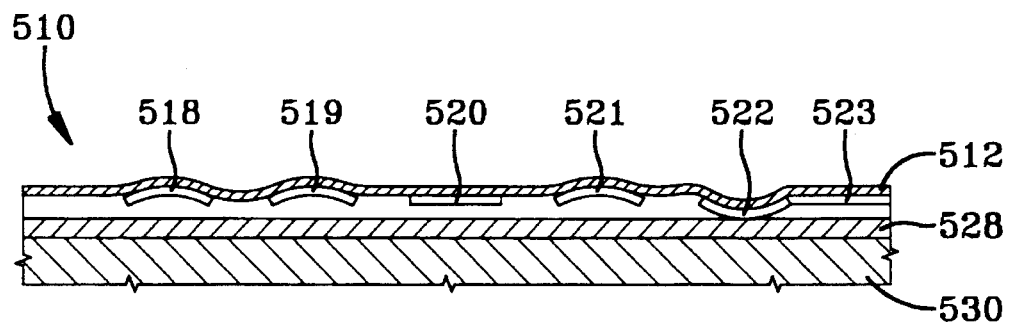
FIG. 11 is a fragmentary cross sectional view of a fifth embodiment of a deicer assembly in accordance with the present invention

Referring now to FIG. 11, wherein a deicer assembly 510 in accordance with a fifth embodiment of the present invention includes an erosion-resistant surface ply or layer 512 which may be comprised of erosion resistant material such as polyurethane, neoprene or estane. Surface ply 512 may also be a high-modulus metal foil such as aluminum, titanium, stainless steel, or a nickel-titanium superelastic alloy (with rubber-like deformation behavior), or a high modulus thin layer of thermoplastic film such as PEEK.

SMA elements or actuator strips 518–523 such as those described and illustrated hereinbefore in the previous figures are attached to the bottom of surface layer 512. When heated or energized above their TTR, SMA elements 518–523 deform surface layer 512 to debond ice accumulated thereon. SMA elements 518–523 are shown in their energized or heated state. It can be seen in FIG. 11 that elements 518, 519 are actuated simultaneously and deform surface layer 512 upward. Elements 520, 523 are shown unactuated to illustrate that the elements 518–523 may be actuated simultaneously, alternately or in other desired patterns to provide effective ice removal, as could the elements illustrated in the previous figures. Element 522 illustrates an inverted element which deflects surface ply 512 downward to complement the upward deflection of element 521. Of course, the SMA element of the present invention may be configured in many ways not explicitly illustrated herein to maximize ice shedding efficiency.

A bottom layer 528 is disposed between SMA elements 518–523 and airfoil 530 and may be comprised of any of a number of suitable materials, such as elastomers, plastic, plastic composites, etc.

Referring now to FIGS. 1–11, the SMA elements may be quickly heated above TTR by direct or indirect methods, applying a pulse current or steady AC or DC current.

For direct heating, some SMA metals have a resistivity range that permits direct heating by a DC or AC current or a high current pulse of short duration for quick actuation. A direct electrical connection permits a heating current to be applied. For example, the NiTi alloy has a conductivity range of 80–100 micro ohms/centimeter. A 15 mil thick strip ¼ inch wide has a resistance of 0.100 to 0.126 ohms per foot length and may readily be used as a self-heater element. Due to the crystalline structure, not all SMA metals permit direct heating due to wire or other shapes made from the metal having the tendency to develop hot spots and break. Making a reliable electrical connection is also an important consideration.

A common method of indirect heating is to use an electrical resistance heater electrically isolated from but bonded to or held in intimate contact with the element while sufficient heat is applied to quickly heat the SMA metal above TTR. Another indirect, non-contact approach would be to use planar coils such as those described in commonly owned U.S. Pat. Nos. 5,129,598 and 5,152,480 to Adams et al., which are hereby incorporated herein by reference. By applying a shaped current pulse to a planar coil, an eddy current would be induced into the actuator strip that would heat the SMA element and the eddy current would also oppose the planar coil current and provide an impact force to help break up and fracture the ice. The advantage of indirect heating is that no electrical connection is required for the SMA element. This approach may be most applicable to a deicer such as shown and described in FIG. 11.

The SMA elements may use an insulated sleeve or coating to prevent electrical contact with other SMA elements or with heating elements, if desired. Deicer construction may otherwise provide the desired separation to prevent contact.

Figure 12A:
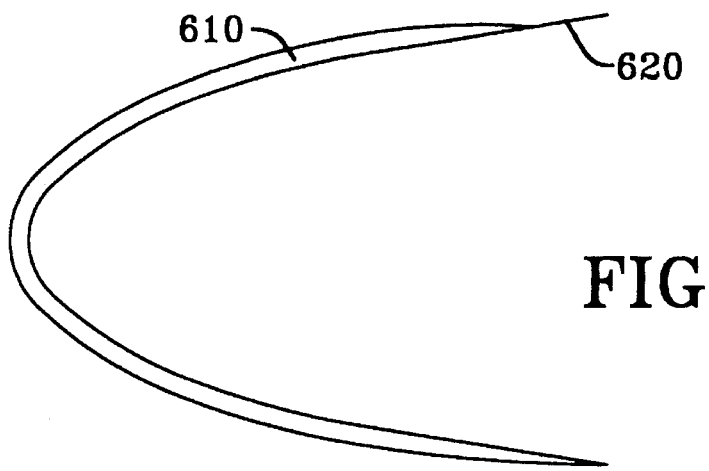
FIGS. 12a–12c are schematic cross sectional views of three different embodiments of the installation of a deicer assembly in accordance with the present invention on an airfoil.
Figure 12B:
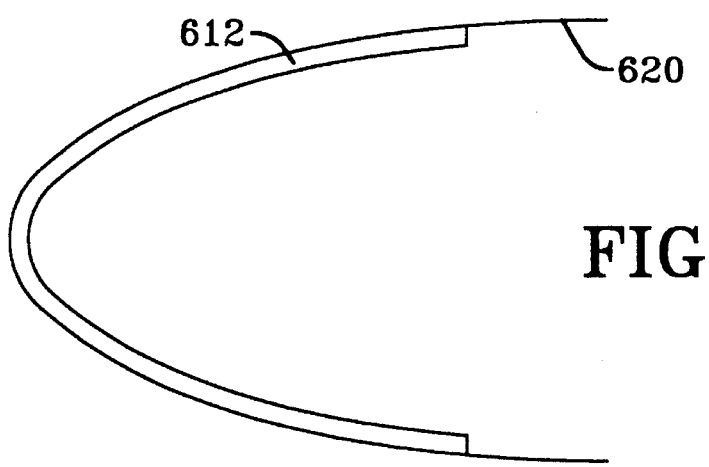
Figure 12C:
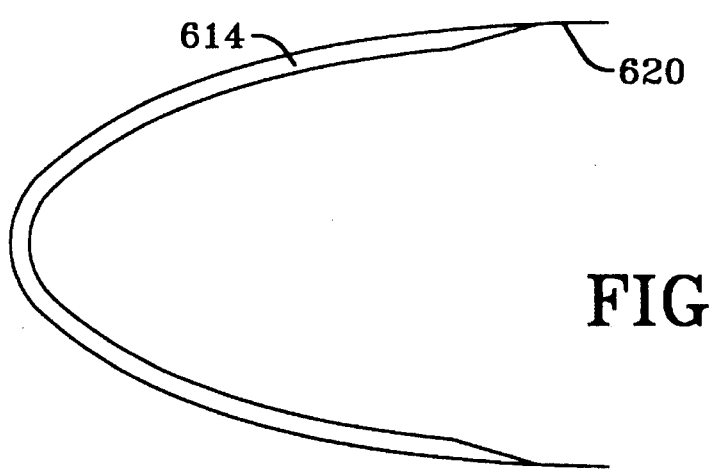

Referring now to FIGS. 12a–12a, deicer assemblies such as those described and illustrated in the previous figures may be installed as a non-recessed attachable construction 610 on a metal or non-metal airfoil 620, or a recessed attachable construction 612 on a metal or non-metal airfoil 620, or as a part of a composite construction where the deicer assembly 614 is generally an integral part of the airfoil 620 construction.

Figure 13:
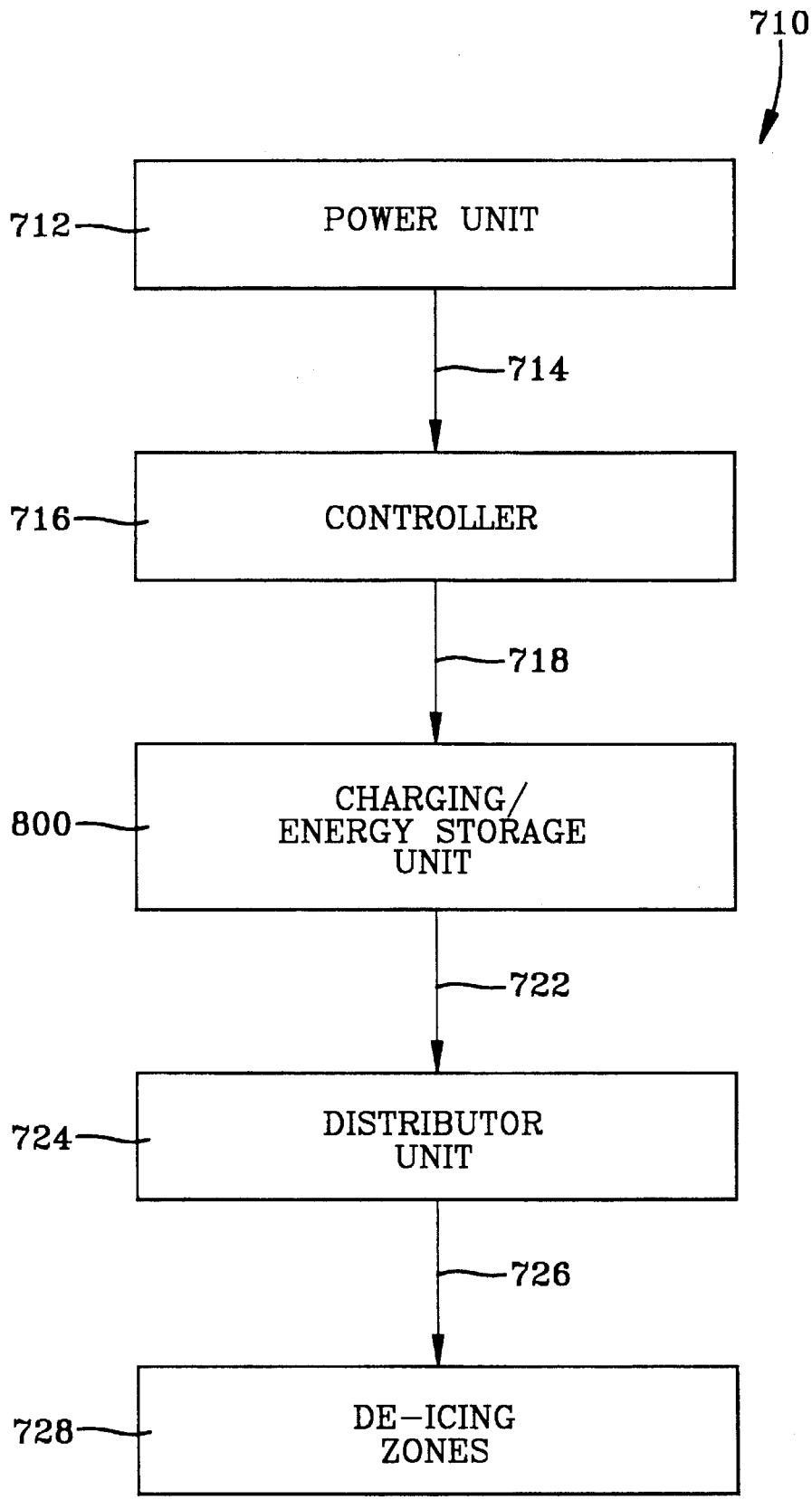
FIG. 13 is a schematic/block diagram of a current control circuit for a deicer in accordance with the present invention.
Figure 14:
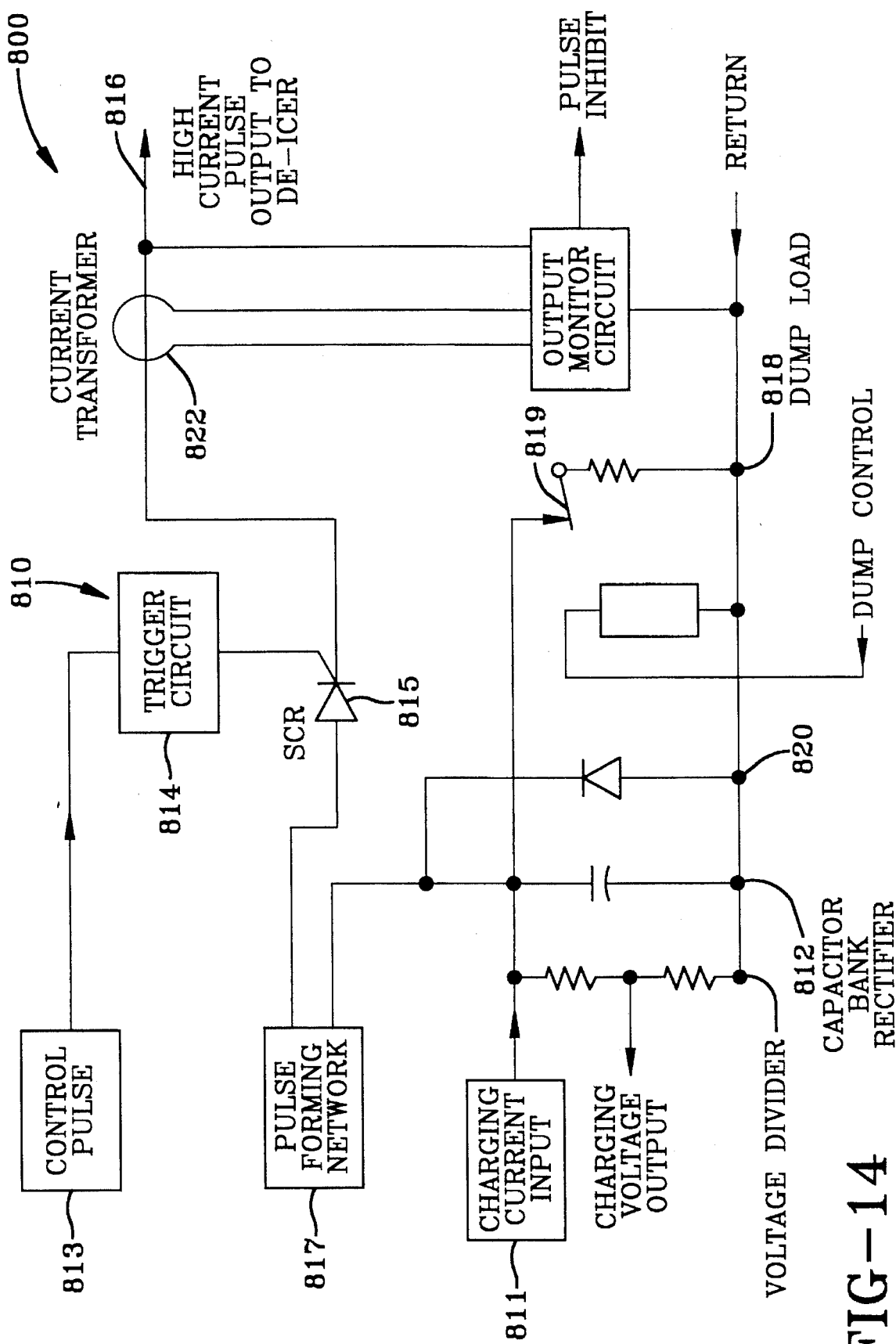
FIG. 14 is a schematic/block diagram of a current pulse generator for the current control circuit illustrated in FIG. 13 in accordance with the present invention.

Referring now to FIGS. 13, 14, a control system 710 for providing a current pulse to the SMA elements for a deicer assembly in accordance with the present invention includes a power unit 712 for providing power through a line 714 to a controller 718 which provides a control signal through a line 718 to a charging/energy storage unit 800, which provides an output current pulse through a line 722 to a distributor unit 724 which distributes the current pulse through a line 726 to the various deicing zones 728.

Referring now to circuit 14, a charging/energy storage unit 800 for use in deicer assemblies in accordance with the present invention includes a charging circuit 811 which charges up a bank of capacitors 812 (only one is illustrated for simplicity) which serve as high voltage energy storage devices. When deicing action is desired, a control pulse 813 is fed to a triggering circuit 814 which discharges capacitor bank 812 through one or more silicon control rectifiers (SCRs) 815 to provide high current pulse outputs 816 to one or more SMA elements. A pulse forming network (PFN) 817 shapes the high current pulse 816 applied to the SMA elements. Whenever an output current pulse from charging/energy storage unit 800 is needed to energize an SMA element, the dump load 818 which maintains the capacitor bank discharged, is removed by opening a switch 819, thereby allowing charging current from charging circuit 811 to charge the capacitor energy storage bank 812 to the desired voltage. When the SCR 815 is triggered on, the capacitor bank 812 is discharged through PFN 817 into the SMA elements (not illustrated in FIG. 14) producing a high current pulse, whose occurrence and magnitude is monitored by means of a current transformer 822.

Pulse forming networks are well known to those skilled in the electronic circuits art and may be used to achieve output current waveforms which approximate ramp, triangular or square waveforms or other shapes for enhancing SMA element heating. To this end, pulse forming networks and current pulse generators are described in greater detail in commonly owned U.S. Pat. No. 4,875,644 to Adams et al., hereby incorporated herein by reference.

It has been determined that for SMA elements in the form of a bent straight wire, as a compression spring and as a tension spring, a stored energy charge dumped as an R-C current pulse will activate the SMA elements. Results of test indicated that a peak current of 80–100 amps provided a good response, 110–150 amps a hard response. Duration of the pulse was in the 12–20 millisecond range. Tests with a flat SMA strip with cross section as shown in FIG. 1 showed some definite response with peak currents in the 1500 to 2700 amps range with a duration of 0.9 msec. Wave form was R-L-C, square wave, triangular wave or other shapes having some peak current duration would likely permit a smaller peak current.

Figure 15A:
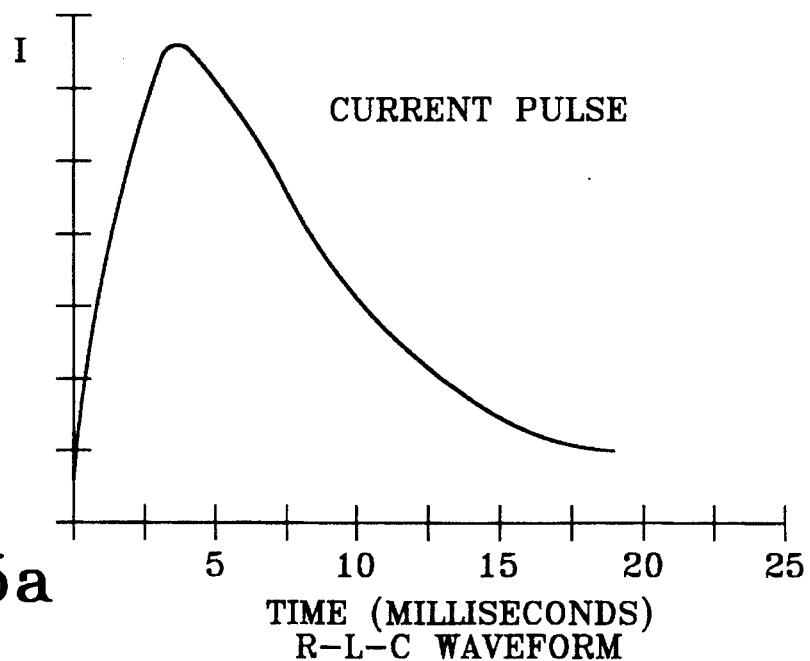
FIGS. 15a–15c are current versus time graphs showing three different current pulse output embodiments for the current pulse generator illustrated in FIG. 14 in accordance with the present invention.
Figure 15B:
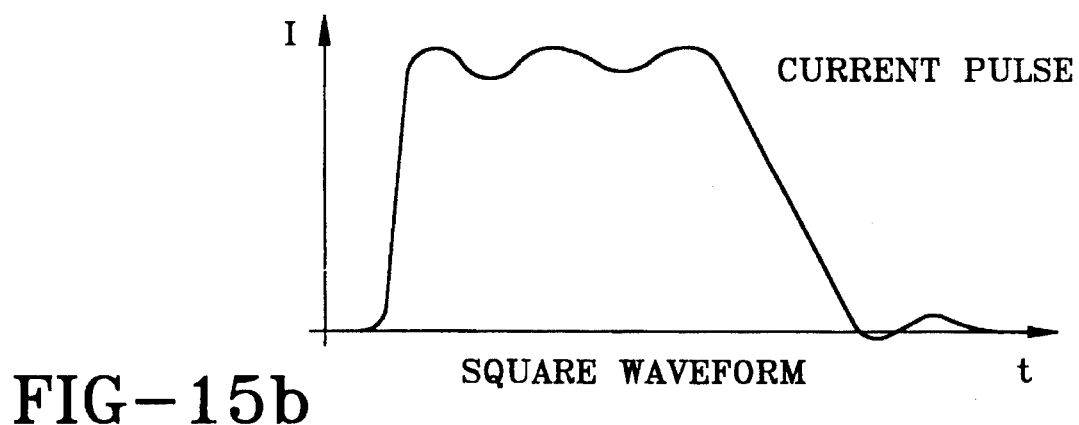
Figure 15C:
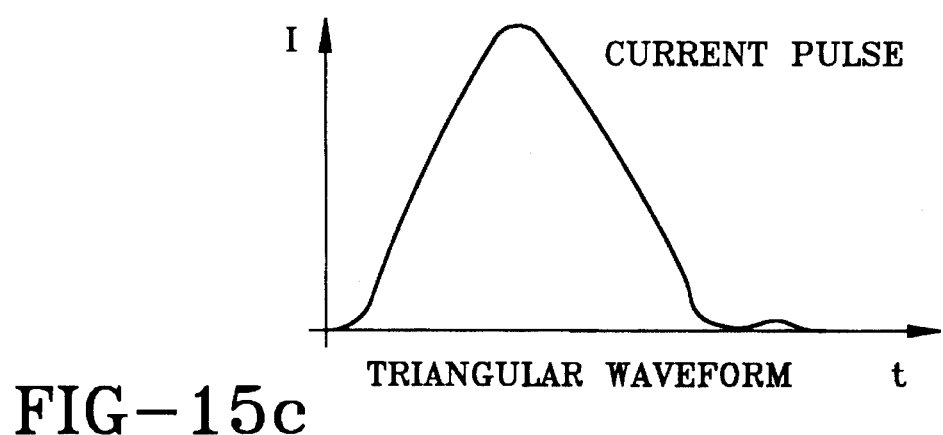

Referring now to FIGS. 15a–15c, typical current pulse waveforms (current versus time graphs) for delivery to deicer assemblies in accordance with the present invention are illustrated and include RLC waveforms with exponential decay (FIG. 15a), square waveforms (FIG. 15b), and triangular waveforms (FIG. 15c).

Figure 16:
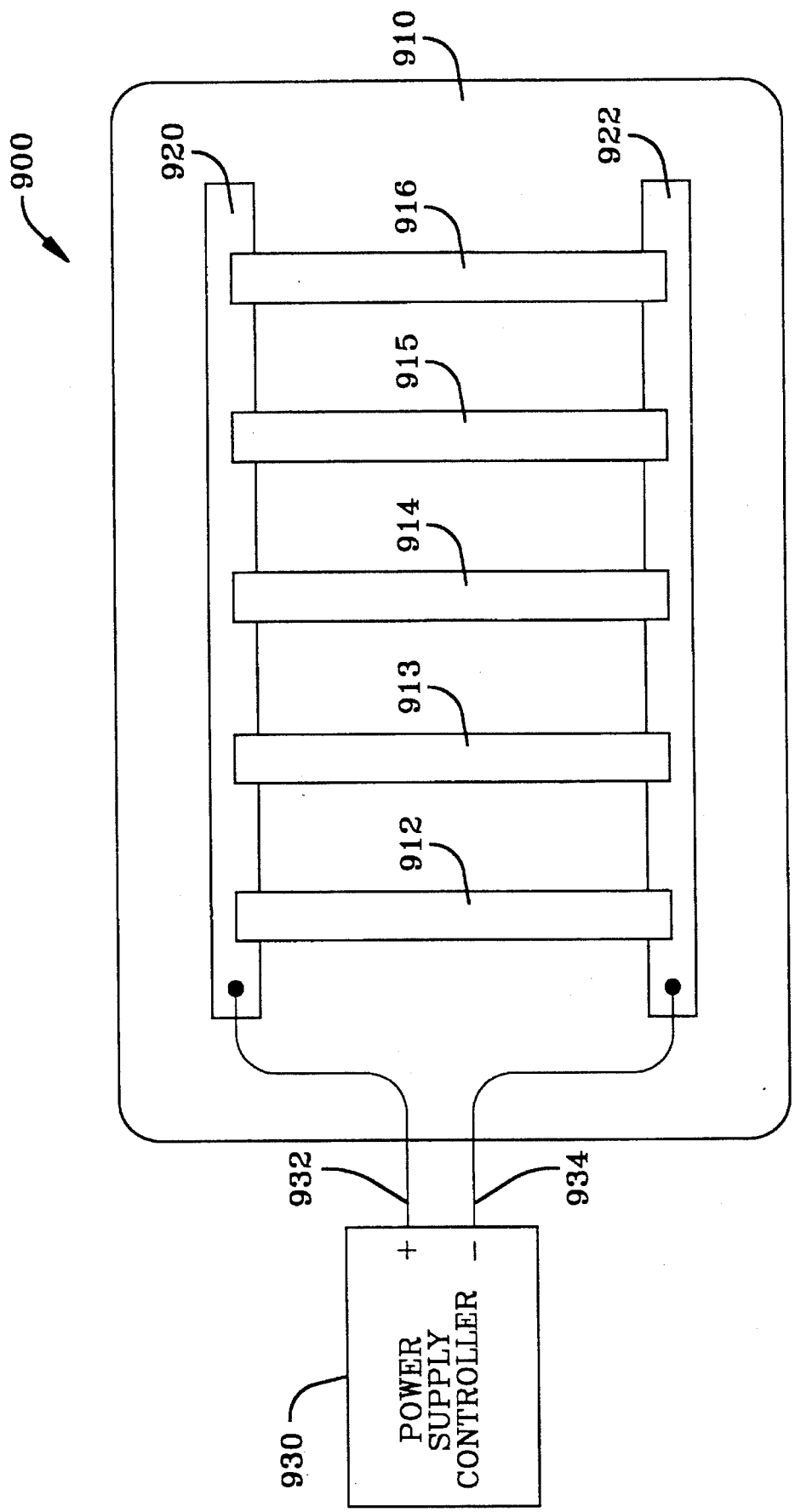
FIG. 16 is a top cut away view of a deicer assembly in accordance with the present invention.

Referring now to FIG. 16, wherein a deicer assembly 900 in accordance with the present invention includes a deicer pad 910 for disposal on an airfoil or other kind of substrate (not shown). Deicer pad 910 includes a plurality of SMA elements 912–916 which are arranged generally parallel to one another. The ends of the SMA elements 912–916 are electrically connected to a pair of bus bars 920, 922. This arrangement is similar to that illustrated and described in FIG. 3e hereinbefore. A power supply/controller 930 provides a continuous current of controlled duration through elements 912–916 through a pair of lines 932, 934 which are electrically connected to bus bars 920, 922, respectively. Current is passed through elements 912–916 until they are heated up through their transformation temperature. The current through the elements is then turned off.

It is to be noted that due to the SMA actuators taking its shaped memory form at temperatures above TTR, construction and curing techniques for the present deicer assemblies will have to be low temperature techniques with materials that cure below TTR, or final construction after the actuator strip is built or inserted into the part if cures are to be accomplished above the TTR. Alternatively, the SMA actuator may be restrained to its flat condition during final cure, or limit final cure to a spot curing of the heat treat "flat" areas of the deicer construction.

Although the invention has been shown and described with exemplary embodiments thereof, it should be understood by those skilled in the art that the foregoing and various other modifications, omissions and additions may be made therein and thereto without departing from the spirit and scope of the invention.

I claim:

1. A deicing apparatus comprising:

a top shell upon which ice accumulates; and, element means comprised of shaped memory metal for changing shape into a predetermined transformation shape for deflecting said top shell when the temperature of said element means is raised to a predetermined transformation temperature.

2. A deicing apparatus in accordance with claim 1, wherein said element means is comprised of an alloy belonging to one of a group including AgCd, AuCd, CuAlNi, CuSn, CuZn, CuZnSi, CuZnSn, CuZnAl, InTi, NiAl, NiTi, FePt, MnCu, FeMnSi, FeCrNiCoMnSi, FeCrNiMnSi.

3. A deicing apparatus in accordance with claim 1, wherein said element means is comprised of a metal strip folded into a serpentine configuration.

4. A deicing apparatus in accordance with claim 1, wherein said element means is comprised of a plurality of folded metal strips attached into a serpentine configuration.

5. A deicing apparatus in accordance with claim 1, wherein said element means is comprised of a plurality of shaped memory metal strips connected between a pair of bus bars.

6. A deicing apparatus in accordance with claim 1, wherein said element means is heat treated in predetermined areas to prevent said predetermined areas from changing shape when said element means is raised to said transformation temperature.

7. A deicing apparatus in accordance with claim 1, wherein said element means has a length and a width, and said element means changes shape in the cross section of said width.

8. A deicing apparatus in accordance with claim 1, wherein said predetermined transformation shape is a semicircular shape.

9. A deicing apparatus in accordance with claim 1, wherein said predetermined transformation shape is a triangular shape.

10. A deicing apparatus in accordance with claim 1, wherein said predetermined transformation shape is a square shape.

11. A deicing apparatus in accordance with claim 1, wherein said element means has a length and a width, and said element means changes shape in the cross section of said length.

12. A deicing apparatus in accordance with claim 1, wherein said predetermined transformation shape is a fan fold shape.

13. A deicing apparatus in accordance with claim 1, wherein said predetermined transformation shape is a coiled spring shape.

14. A deicing apparatus in accordance with claim 1, wherein said top shell is comprised of an erosion resistant layer disposed over an expandable layer, said deicing apparatus further comprising:

a bottom layer disposed under said expandable layer;

stitching means for connecting said expandable layer to said bottom layer in a predetermined pattern which defines expandable passages, and wherein said element means are disposed in said expandable passages.

15. A deicing apparatus in accordance with claim 1, wherein said top shell is comprised of a thin high tensile modulus outer skin, said deicing apparatus further comprising:

a fiber reinforced matrix composite substructure disposed under said top shell and element means.

16. A deicing apparatus in accordance with claim 15, further comprising:

expandable tubular members formed from fabric coated on at least one surface with polymeric material, and wherein said element means is disposed in said expandable tubular members.

17. A deicing apparatus in accordance with claim 15, wherein said top shell is comprised of a thin high tensile modulus outer skin, said deicing apparatus further comprising expandable tubular members, and wherein said element means are disposed in said expandable tubular members.

18. A deicing apparatus in accordance with claim 15, wherein said top shell is comprised of a thin high tensile modulus outer skin and a fiber reinforced matrix composite backing layer.

19. A deicing apparatus in accordance with claim 15, wherein said top shell is comprised of:

a primary layer comprised of a first fabric reinforced by a nitrile phenolic resin; and, a backing layer comprised of a second fabric reinforced by an epoxy resin.

20. A deicing apparatus in accordance with claim 1, further comprising containment means for holding said element means in place.

21. A deicing apparatus in accordance with claim 20, further comprising a bottom layer disposed under said element means and containment means, and wherein said containment means is attached to said bottom layer.

22. A deicing apparatus in accordance with claim 20, wherein said element means are attached to said top shell.

23. A deicing apparatus in accordance with claim 20, wherein the deicing apparatus is disposed on the outside of an airfoil.

24. A deicing apparatus in accordance with claim 20, wherein the deicing apparatus is disposed on the outside of a recess provided in an airfoil.

25. A deicing apparatus in accordance with claim 1, further comprising controller means for energizing said element means above said predetermined transformation temperature.

26. A deicing apparatus in accordance with claim 1, further comprising controller means for providing a current pulse through said element means to thereby raise said element means above said predetermined transformation temperature.

27. A method of deicing an outer shell comprising the steps of:

providing a shaped memory metal element means beneath an outer shell; and deflecting said outer shell by changing the shape of said element means into a predetermined transformation shape by raising the temperature of said element means to a predetermined transformation temperature.

28. A method of deicing an outer shell in accordance with claim 27, wherein said element means is comprised of an alloy belonging to one of a group including AgCd, AuCd, CuAlNi, CuSn, CuZn, CuZnSi, CuZnSn, CuZnAl, InTi, NiAl, NiTi, FePt, MnCu, FeMnSi, FeCrNiCoMnSi, FeCrNiMnSi.

29. A method of deicing an outer shell in accordance with claim 27, wherein said element means is comprised of a metal strip folded into a serpentine configuration.

30. A method of deicing an outer shell in accordance with claim 27, wherein said element means is comprised of a plurality of folded metal strips attached into a serpentine configuration.

31. A method of deicing an outer shell in accordance with claim 27, wherein said element means is comprised of a plurality of shaped memory metal strips connected between a pair of bus bars.

32. A method of deicing an outer shell in accordance with claim 27, wherein said outer shell is comprised of an erosion resistant layer disposed over an expandable layer, the method further comprising the steps of:

providing a bottom layer disposed under said expandable layer;

stitching said expandable layer to said bottom layer in a predetermined pattern which defines expandable passages, and disposing said element means in said expandable passages.

33. A method of deicing an outer shell in accordance with claim 27, wherein said outer shell is comprised of a thin high tensile modulus outer skin, the method further comprising the step of:

providing a fiber reinforced matrix composite substructure under said outer shell and element means.

34. A method of deicing an outer shell in accordance with claim 33, further comprising:

expandable tubular members formed from fabric coated on at least one surface with polymeric material, and wherein said element means is disposed in said expandable tubular members.

35. A method of deicing an outer shell in accordance with claim 27, wherein said outer shell is comprised of a thin high tensile modulus outer skin, the method further comprising the step of disposing said element means in expandable tubular members.

36. A method of deicing an outer shell in accordance with claim 27, wherein said outer shell is comprised of a thin high tensile modulus outer skin and a fiber reinforced matrix composite backing layer.

37. A method of deicing an outer shell in accordance with claim 27, wherein said outer shell is comprised of:

a primary layer comprised of a first fabric reinforced by a nitrile phenolic resin; and, a backing layer comprised of a second fabric reinforced by an epoxy resin.

38. A method of deicing an outer shell in accordance with claim 27, further comprising the step of attaching said element means to the bottom of the outer shell.

* * * * *